United States Patent [19]

Fox

[11] Patent Number: 4,480,871
[45] Date of Patent: Nov. 6, 1984

[54] DUMP BED STABILIZER

[76] Inventor: Eldred A. Fox, Box 654, Syracuse, Kans. 67878

[21] Appl. No.: 473,557

[22] Filed: Mar. 9, 1983

[51] Int. Cl.³ .............................................. B60P 1/16
[52] U.S. Cl. .................................. 298/22 J; 298/17 R
[58] Field of Search ............... 298/17 R, 19 R, 20 R, 298/22 R, 22 J, 22 P, 22 D

[56] References Cited

U.S. PATENT DOCUMENTS

| | | | |
|---|---|---|---|
| 2,234,134 | 3/1941 | Barrett | 298/22 R X |
| 2,332,961 | 10/1943 | Wood | 298/22 J |
| 2,698,199 | 12/1954 | Godbersen | 298/22 J |
| 3,784,162 | 1/1974 | Channell et al. | 298/22 J X |
| 3,809,429 | 5/1974 | Channell | 298/22 J X |

FOREIGN PATENT DOCUMENTS 1493042 7/1967 France ............... 298/22 P

Primary Examiner—Leslie J. Paperner
Attorney, Agent, or Firm—Harvey B. Jacobson

[57] ABSTRACT

A pair of elongated arm assemblies are provided each having first and second ends. The first ends of the arm assemblies are pivotally connected for relative swinging of the arm assemblies in a plane paralleling both arms and the second end of one arm assembly is pivotally anchored between the longitudinal frame rails of the main frame of a vehicle while the second end of the other arm assembly is pivotally anchored between the longitudinal stringer rails of a dumping load bed of the pivoted type supported from the vehicle main frame. The second ends of the arm assemblies include transverse tubular members in whose opposite ends pivot shaft members are rotatably and slidably received and the opposing sides of the main frame rails and load bed stiffener rails include opposing socket members supported therefrom in which the outwardly projecting ends of the corresponding pivot shaft members are slidably and rotatably received. After the pivot shaft members have been substantially fully seated within the socket members they are selded in position relative to the corresponding transverse tubular member ends. In this manner, the second ends of the arm assemblies may be mounted between main frame rails and load body stringer rails which are spaced different distances apart.

7 Claims, 4 Drawing Figures

DUMP BED STABILIZER

BACKGROUND OF THE INVENTION

Dump beds which are pivotally mounted upon vehicle main frames are subject to twisting relative to the associated main frames when the dump beds are raised toward their full dumping positions. Accordingly, in many instances dump beds include stabilizing structures in order to prevent twisting of the dump beds relative to the associated main frames. Examples of such dump bed stabilizers including some of the general structural and operational features of the instant invention are disclosed in U.S. Pat. Nos. 1,640,358, 2,620,225, 2,731,293 and 2,861,837. However, these previously known forms of dump bed stabilizers are not specifically designed to enable a given dump bed stabilizer to be retrofitted to a vehicle having longitudinal frame rails and load bed stiffener rails spaced various differences apart. Accordingly, each load bed stabilizer must be constructed for a particular load bed and truck frame with which it is to be used.

Accordingly, a need exists for an improved dump bed stabilizer constructed in a manner whereby a single stabilizer may be operatively mounted between dump bed longitudinal stringers and vehicle longitudinal main frame members spaced different distances apart.

BRIEF DESCRIPTION OF THE INVENTION

The stabilizer of the instant invention comprises a pair of arm assemblies having one pair of corresponding ends pivotally joined together, as is broadly conventional. However, the other pair of ends of the stabilizer arm assemblies are constructed in a manner whereby they may be mounted between support members therefor spaced different distances apart and with the mounting structure for the arm assemblies compensating for different spacing between opposing support structures.

The main object of this invention is to provide a dump bed stabilizer which may be utilized effectively to stabilize a dump bed when the dump bed is raised toward its fully raised position.

Another object of this invention is to provide a dump bed stabilizer constructed in a manner whereby a given stabilizer may be operatively mounted upon dump trucks or the like having different spacing between the longitudinal main frame members hereof and also different spacing between the longitudinal load bed stiffener rails thereof.

A still further object of this invention is to provide a dump bed stabilizer which may be readily operatively mounted between the main frame and load bed stringer rails of a dump truck or similar vehicle by a person having only minimum mechanical skills but which is capable of performing an acceptable welding operation.

Still another important object of this invention is to provide a dump bed stabilizer which may be readily operatively associated with dump bed equipped vehicles of various types.

A final object of this invention to be specifically enumerated herein is to provide a dump bed stabilizer in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
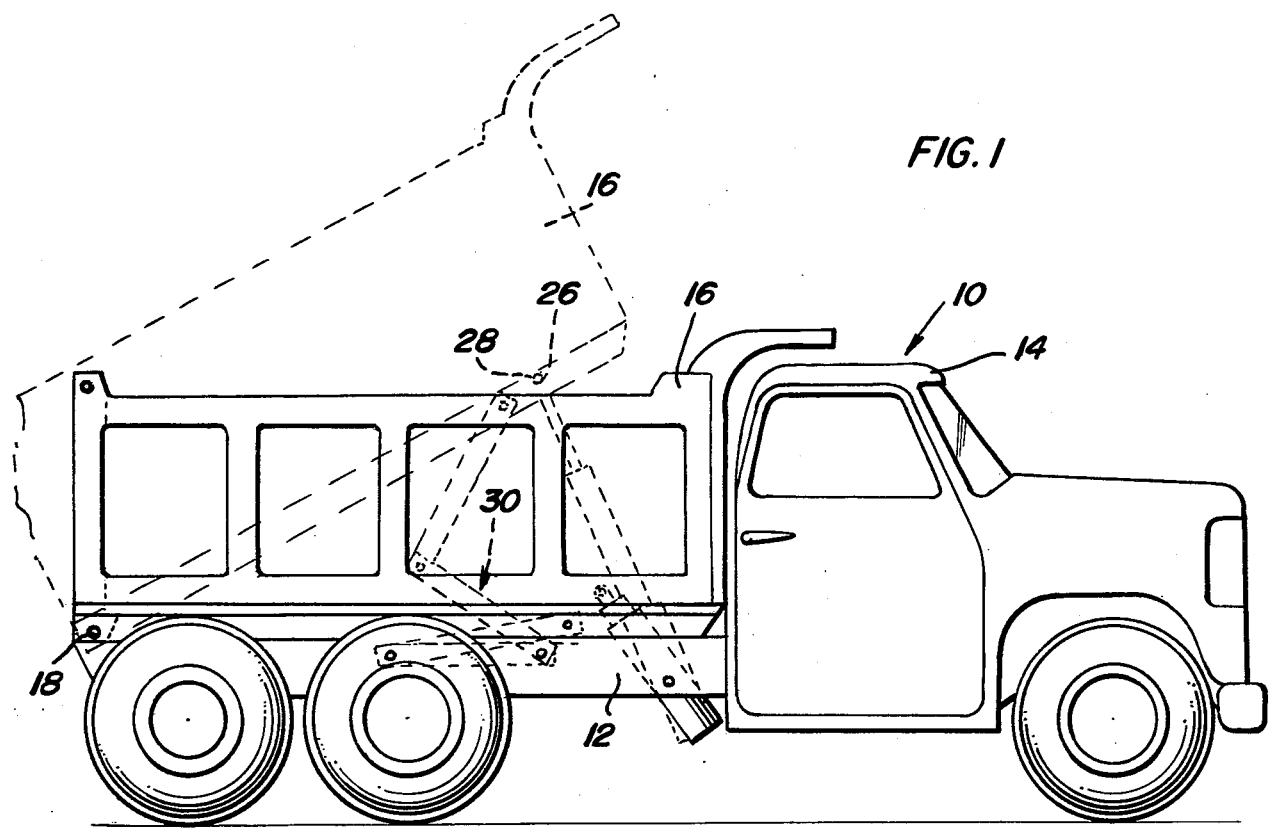
FIG. 1 is a side elevational view of a conventional form of dump truck with the load bed thereof illustrated in a lowered position in solid lines and in a raised position in phantom lines, the stabilizer of the instant invention being illustrated in phantom lines in operative association with the truck main frame and stringer rails of the dump bed.
Figure 2:
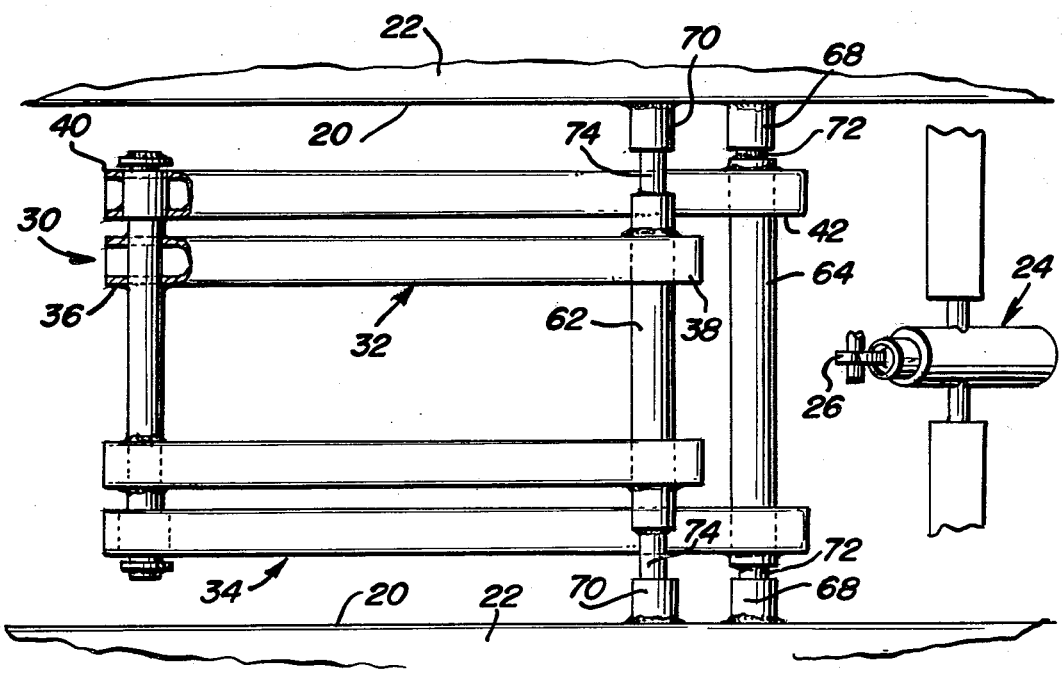
FIG. 2 is an enlarged fragmentary plan view of the stabilizer and the main frame and load bed stringer rails from which the stabilizer is mounted.
Figure 3:
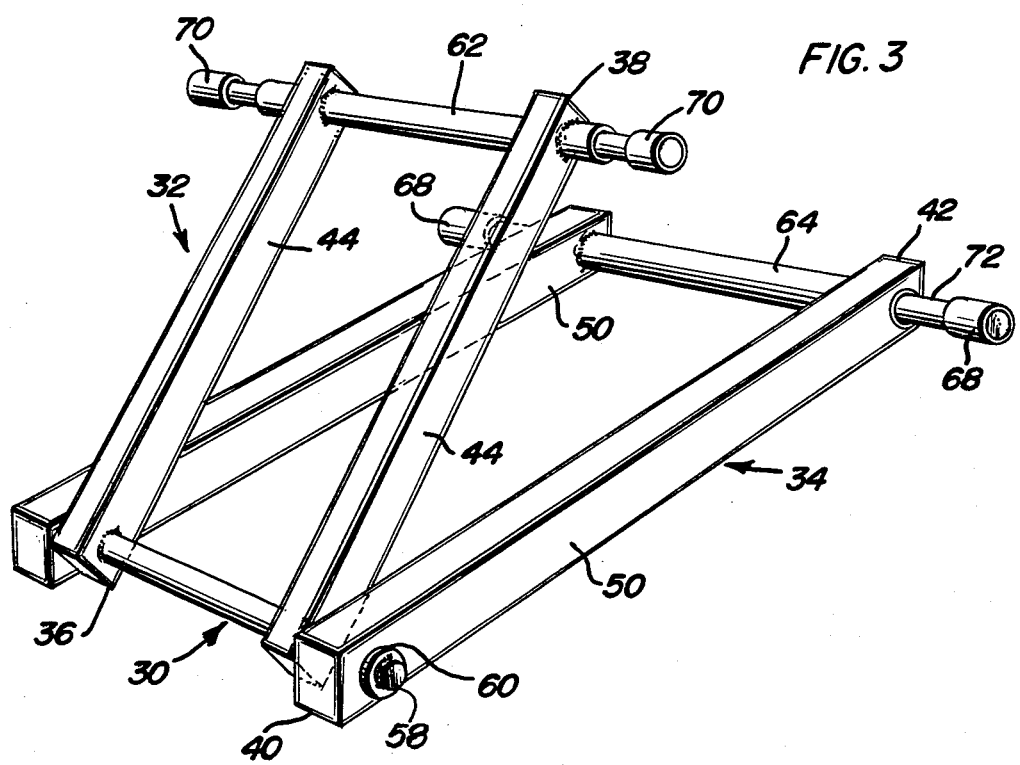
FIG. 3 is a perspective view of the stabilizer in a partially open position.
Figure 4:
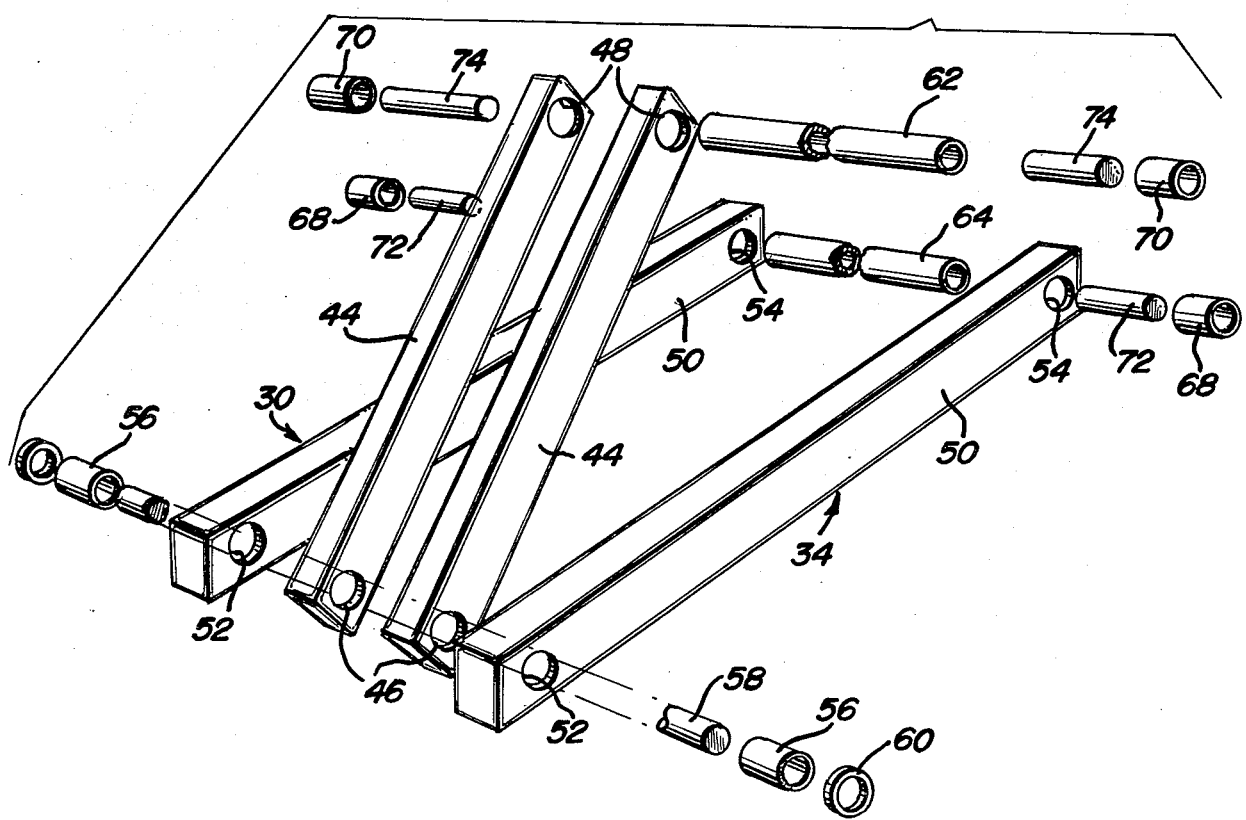
FIG. 4 is an exploded perspective view of the stabilizer.

Referring now more specifically to the drawings the numeral 10 generally designates a conventional form of dump truck including a main frame 12, a forward cab portion 14 mounted on the main frame and a dumping load bed 16 pivotally supported from the rear end of the main frame 12 as at 18 for angular displacement between the lowered horizontal solid line position illustrated in FIG. 1 and the raised inclined dumping position illustrated in phantom lines in FIG. 1. The main frame 12 includes opposite side longitudinal frame rails 20 and the load bed 16 includes longitudinal stringer rails 22.

A hydraulic cylinder assembly referred to in general by the reference numeral 24 is oscillatably supported from the main frame 12 and includes a free piston end 26 which is anchored relative to the load bed 16 as at 28. Accordingly, upon extension of the hydraulic cylinder 24 the load bed may be raised from the lowered position illustrated in solid lines in FIG. 1 of the drawings to the inclined dumping position illustrated in phantom lines in FIG. 1.

The foregoing description is to be considered as conventional insofar as the construction of the dump truck 10 is concerned.

The stabilizer of the instant invention is referred to in general by the reference numeral 30 and includes first and second arm assemblies referred to in general by the reference numerals 32 and 34. The arm assembly 32 includes first and second ends 36 and 38 and the arm assembly 34 includes first and second ends 40 and 42.

The arm assembly 32 includes a pair of laterally spaced apart parallel arms 44 which each comprise a rectangular tubular member and one pair of corresponding ends of the arms 44 include pairs of registered opposite side transverse bores 46 while the other pair of corresponding ends of the arms 44 include corresponding pairs of opposite side registered transverse bores 48. Further, the arm assembly 34 includes a pair of laterally spaced parallel arms 50 comprising tubular members of rectangular cross section and one pair of ends of the arms 50 are provided with registered opposite side bores 52 while the other pair of corresponding ends of the arms 50 are provided with pairs of opposite side registered transverse bores 54.

A pair of sleeves 56 have their opposite ends received through a corresponding pair of the bores 52 and are welded in position relative to the arms 50. A cylindrical bar member 58 is passed through the sleeves 56 and the bores 46 and is welded in position relative to the arms 44. Abutment washers 60 are then welded on the ends of the bar 58 spaced slightly outwardly of the remote sides of the arms 50.

A cylindrical sleeve 62 is passed through the bores 48 in the arms 44 and welded in position relative to the latter and a similar sleeve 64 is passed through the bores 54 in the arms 50 and welded in position. Then, a pair of sleeves 68 are welded in axially aligned positions against the inner sides of the frame rails 20 and a pair of similar sleeves 70 are welded in axially aligned positions on the inner sides of the stringers 22. Thereafter, short pivot shafts 72 are telescoped within the ends of the sleeve 64 and similar pivot shafts 74 are telescoped in the ends of the sleeve 62. Thereafter, the ends of the sleeve 64 are registered with sleeves 68, the short pivot shafts 72 are slid partially outwardly of the ends of the sleeve 64 into substantially fully seated positions against the frame rails 20 within the sleeves 68 and welded in position relative to the adjacent ends of the sleeve 64. The pivot shafts 72 are of course rotatably received within the sleeves 68. Thereafter, the ends of the sleeve 62 are aligned with the opposing ends of the sleeves 70 and the pivot shafts 74 are slid partially outwardly of the ends of the sleeve 62 and substantially fully seated within the sleeves 70. Thereafter, the pivot shafts 74 are welded in position relative to the ends of the sleeve 62. Here again, the pivot shafts 74 are rotatably received within the sleeves 70. Thus, the pivot shafts 72 and 74 define pivot connections between the second ends 42 and 38 of the arm members 34 and 32 between the frame rails 20 and the stringer rails 22, respectively. Thus, when the load bed 16 is raised from the lowered position illustrated in solid lines in FIG. 1 toward the phantom line indicated raised position thereof in FIG. 1, the arm assemblies 32 and 34 of the stabilizer 30 open relative to each other and maintain a connection between the forward end of the load bed 16 and the main frame 12 adjacent the hydraulic cylinder 24.

Because the shafts 72 and 74 are of sufficient length not only to be substantially fully seated within the sleeves 68 and 70 but also to be telescoped considerably into the corresponding ends of the sleeves 62 and 64, the spacing between the frame rails 20 and the stringers 22 may vary. Thus, the stabilizer 30 may be mounted between frame rails and stringers which are spaced further apart than the frame rails 20 and stringers 22. Further, the stabilizer 30 is obviously constructed of readily available components and may be marketed in kit form for installation by anyone having the ability to weld properly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle including laterally spaced longitudinal frame rails, a load bed pivotally supported from said frame rails and equipped with laterally spaced apart stringer rails and lift means operatively connected to and between the frame and the load bed for raising the load bed to an inclined dumping position, a load bed stabilizer including a pair of elongated arm assemblies each having first and second ends, means pivotally joining said first ends for relative swinging of said arm assemblies in the same plane, first pivot means pivotally mounting the second end of one arm assembly to said frame rails and second pivot means pivotally mounting the second end of the other arm assembly to said stringer rails, said lift means being operatively connected between said frame and load bed independent of said stabilizer, at least one of said second ends including a transverse tubular member whose opposite end portions define a pair of deep endwise outwardly opening sockets, a pair of socket members carried by and fixedly mouned upon the correpsonding rails and opening toward and opposing said sockets, said pivot means including pivot shafts having first and second ends, said first ends being adjustably slidingly telescoped into said sockets with said second ends aligned with said socket members, said shafts being partially outwardly shiftable from said sockets toward outward shifted positions with said second ends telescoped into and journalled in said socket members, said first ends of said pivot shafts being weldable in said outward shifted positions in said sockets.

2. The combination of claim 1 wherein the other of said second ends also includes a transverse member defining opposite end outwardly opening sockets and the corresponding rails support a pair of opposing socket members, said pivot means also including additional pivot shafts having first ends telescoped into the last mentioned sockets and being partially outwardly shiftable therefrom toward outward shifted positions with the second ends of the last mentioned shafts telescoped into and journalled in the last mentioned socket members, the first ends of said additional pivotal shafts being weldable in the outward shifted positions thereof in the last mentioned socket members.

3. The combination of claim 2 wherein said arm assemblies each include a pair of laterally spaced apart longitudinal tubular members, the opposite ends of said transverse members extending through and being anchored to the corresponding ends of said tubular members.

4. The combination of claim 3 including a bar member having opposite end portions extending through said tubular members at said first ends of said arm assemblies and rigidly anchored relative to the tubular members of one of said arm assemblies, the tubular members of the other arm assembly having transverse sleeves secured therethrough, the end portions of said bar member also extending through and being rotatably received in the last mentioned sleeves.

5. The combination of claim 4 wherein said socket members comprise sleeves axially abutted against the opposing sides of said frame rails and stringer rails.

6. The combination of claim 5 wherein said vehicle comprises a dump truck.

7. The combination of claim 6 wherein the ends of the tubular members of said arm assembly pivotally connected to said stringer rails are spaced closer together than the tubular members of the arm assembly pivotally connected to said frame rails and are received between the tubular members of the last mentioned arm assembly defining the first end thereof.

* * * * *